Patented Nov. 29, 1949

2,489,651

UNITED STATES PATENT OFFICE 2,489,651

PRODUCTION OF ORGANIC TITANIUM COMPOUNDS

Carl M. Langkammerer, Wilmington, Del., assignor to E. I. du Pont de Nemours & Company, Wilmington, Del., a corporation of Delaware No Drawing. Application June 25, 1946
Serial No. 679,267

6 Claims. (Cl. 260—429)

This invention relates to the production of novel, organic titanium compounds, and more particularly to the preparation of new basic titanium salts of lower saturated unsubstituted aliphatic carboxylic acids.

More specifically the invention relates to the production of new basic tetravalent titanium acylates in which the acyl group contains not more than 6 carbon atoms; of new basic tetravalent titanium acylates derived from titanium halides and saturated aliphatic monocarboxylic acids containing not more than 6 carbon atoms; of new basic tetravalent titanium acetates; and to novel methods for preparing such compounds.

In accordance with this invention, stable basic tetravalent titanium acylates corresponding in composition substantially to the general formula $Ti(OH)_x(OCOR)_{4-x}$, wherein $x$ is an integer from 1 to 3 and R is an alkyl radical containing not more than 5 carbon atoms, are prepared by reacting one mol of a tetravalent titanium halide with at least 4 mols of a salt of a saturated aliphatic monocarboxylic acid containing not more than 6 carbon atoms in the presence of an anhydrous organic solvent at a temperature in the range of from 20° C. to 125° C. The resulting basic titanium acylate is highly useful as a modifier for polyhydroxylated polymeric compounds, such as polyvinyl alcohol, partially hydrolyzed ethylene/vinyl acetate polymers, cellulose, starch, and the like.

In one specific preferred method for preparing my novel compounds, 4 mols of an alkali-metal (sodium, potassium, lithium) acetate, preferably potassium acetate, is dissolved in about 4 times its weight of absolute ethanol and the reaction mixture cooled to between 0° C. and 15° C. To the resulting solution is then added, slowly and with continuous stirring, one mol of a stable titanium tetrahalide, preferably the tetrachloride, and the reaction mixture is then allowed to stand with stirring. After reaction is complete, the alkali metal chloride which separates is filtered and the filtrate evaporated to dryness to isolate the desired basic tetravalent titanium acetate.

To a clearer understanding of the invention, the following specific examples are given, which illustrate, but are not intended to limit, the invention. Parts are by weight unless otherwise stated.

Example I

To one hundred eighty-six and two tenths parts of potassium acetate is added 600 parts of glacial acetic acid and 100 parts of acetic acid containing a small amount of water. To the reaction mixture is then added slowly with stirring over a period of ½ hour 94.9 parts of titanium tetrachloride. Six hundred parts of absolute alcohol are added and stirring is continued for 15 minutes, after which the reaction mixture is allowed to stand for 16 hours. The reaction mixture and 144 parts of potassium chloride is separated. The filtrate is vacuum distilled and 300 parts of solvent collected. To the distillation residue there is added 600 parts of anhydrous ether. The precipitate which forms is filtered under anhydrous conditions. Seventy grams of basic titanium acetate, corresponding to the empirical formula $Ti(OH)_3(OCOCH_3)$ is obtained. Analysis gives the following values: Calc'd for $C_2H_6O_5Ti$: C, 15.2%; H, 3.82%; Ti, 30.33%, mol. wt. 157.9. Found: C, 15.59%; H, 3.77%; Ti, 29.47%; molecular weight 474, 457.

The above carbon, hydrogen and titanium values support the empirical formula but the molecular weight values would indicate that the basic titanium acetate is probably trimeric.

The basic titanium acetate, prepared as described above, is initially soluble in ethanol, methanol, and water, but insoluble in other organic solvents. Alcoholic solutions are relatively stable while aqueous solutions gel on being heated to the boiling point. In the solid form the solubility decreases on standing. After 4 to 6 weeks the product is no longer soluble in solvents in which it was initially soluble.

Example II

One hundred eighty-six and two tenths parts of potassium acetate and 400 parts of absolute alcohol are placed in a reaction vessel and cooled to 10° C. and 94.9 parts of titanium tetrachloride are added over a period of 1.5 hours. The reaction mixture is stirred for an hour and filtered. The precipitate of potassium chloride which weighs 149 parts is separated by filtration. The filtrate is evaporated to dryness in vacuum. Fifty-two parts of product is obtained. Analysis gives the following values: Calc'd for $C_4H_8O_6Ti$: C, 24.0%, H, 4.0%, Ti, 24.0%. Found: C, 22.77%; H, 3.95%; Ti, 27.71%. The analytical values approximate those for $Ti(OH)_2(OCOCH_3)_2$. The product is soluble in water, methanol and ethanol and insoluble in other organic solvents. A 20% aqueous solution is stable at room temperature.

Although potassium acetate has been used in the above examples, it is to be understood that this is merely preferred and that other metal salts or mixtures of metal salts of lower saturated aliphatic monocarboxylic acids can be generally used. Among examples thereof may be mentioned the sodium, potassium, calcium, magnesium, silver, etc., salts of formic acid, acetic acid, propionic acid, butyric acid, valeric acid, etc. As already noted, it is essential in the invention that at least 4 mols of the metal salt be used for each mol of tetravalent titanium halide present in the reaction. Otherwise, the stable, neutral product having the $Ti(OH)_x(OCOR)_{4-x}$ linkage and requisite properties herein mentioned will not be obtained.

In place of titanium tetrachloride, there can be used other titanium tetrahalides, e. g., titanium tetrafluoride and titanium tetrabromide. Because of its availability and reactivity, the preferred titanium tetrahalide for use in the practice of this invention is the chloride.

Similarly, although acetic acid and absolute ethanol have been used in the examples, it is to be understood that methanol, propanol, butanol, esters, such as ethyl, butyl, and propyl acetates, hydrocarbons, such as benzene, toluene, xylene, gasoline, and the like, can be used equally as well.

The basic tetravalent titanium acylates of this invention can be made either at ordinary temperatures or at temperatures up to 125° C. Generally, the effect of the use of elevated temperatures is to accelerate the rate of reaction.

The basic tetravalent titanium acylates of this invention are useful as modifiers for such polyhydroxylated polymers as polyvinyl alcohols, partially hydrolyzed ethylene/vinyl acetate polymers, cellulose, starch, and the like. These titanium salts decrease solubility, improve hardness, and raise the softening point of these polyhydroxylated polymers. In contrast to previously-used titanium salts of mineral acids, the acid radical of these basic titanium acylates does not deteriorate these hydroxyl-containing polymeric materials to the degree encountered with mineral acid radicals, such as the chloride or sulfate.

I claim as my invention:

1. As a new, stable, basic tetravalent titanium compound, the acylate corresponding to the formula $Ti(OH)_x(OCOR)_{4-x}$, wherein $x$ is an integer from 1 to 3 and R is an alkyl radical containing not more than 5 carbon atoms, said compound being both alcohol- and water-soluble.

2. Stable, basic tetravalent titanium acetate, corresponding to the formula $Ti(OH)_3(OCOCH_3)$, said compound being both alcohol- and water-soluble.

3. A method for producing a stable, basic tetravalent titanium acylate having the formula $Ti(OH)_x(OCOR)_{4-x}$, wherein $x$ is an integer from 1 to 3 and R is an alkyl radical containing not more than 5 carbon atoms, comprising reacting a tetravalent titanium tetrahalide with a metal salt of a saturated aliphatic monocarboxylic acid containing not more than 6 carbon atoms, employing in the reaction at least 4 mols of said metal salt for each mol of tetrahalide present, and effecting said reaction in the presence of substantially anhydrous hydroxyl containing organic solvent.

4. A method for producing a stable, basic tetravalent titanium acylate having the formula $Ti(OH)_x(OCOR)_{4-x}$, wherein $x$ is an integer from 1 to 3 and R is an alkyl radical containing not more than 5 carbon atoms, comprising reacting at a temperature ranging from 20–125° C. one mol of a tetravalent titanium halide with at least 4 mols of an alkali metal salt of an unsubstituted, saturated aliphatic monocarboxylic acid containing not more than 6 carbon atoms in the presence of substantially anhydrous hydroxyl containing organic solvent, and thereafter recovering the resulting acylate product.

5. A method for preparing stable, basic tetravalent titanium acetate corresponding to the formula $Ti(OH)_3(OCOCH_3)$ comprising reacting at temperatures ranging from 20° C.–125° C. one mol of titanium tetrachloride with at least 4 mols of an alkali metal acetate in the presence of absolute alcohol, and then isolating and recovering the resulting basic tetravalent titanium acetate.

6. A method for preparing stable, basic tetravalent titanium acetate corresponding to the formula $Ti(OH)_3(OCOCH_3)$ comprising dissolving at least 4 mols of potassium acetate in ethanol, cooling the resulting solution to between 0° C. and 15° C., admixing a mol of titanium tetrachloride with said solution, and, on completion of the resulting reaction, isolating and recovering the basic tetravalent titanium acetate produced.

CARL M. LANGKAMMERER.

REFERENCES CITED

The following references are of record in the file of this patent:

UNITED STATES PATENTS

| Number | Name | Date |
|---|---|---|
| 1,059,740 | Liebknecht | Apr. 22, 1913 |
| 2,027,812 | Crundall | Jan. 14, 1936 |
| 2,233,358 | Nutting | Feb. 15, 1941 |
| 2,316,141 | Wainer | Apr. 6, 1943 |

FOREIGN PATENTS

| Number | Country | Date |
|---|---|---|
| 248,251 | Germany | June 18, 1912 |

OTHER REFERENCES

Fichter et al.: Helvitica Chem. Acta, V, and p. 1082 (1924).

Gina: Zeitschrift für Anorg. & Alleg. Chem., vol. 166, pp. 306–310 (1927).

Rosenheim: "Zeit. Anorg. Chem.," vol. 26 (1901), page 254.